US009583942B2

(12) United States Patent
Czarnecki

(10) Patent No.: US 9,583,942 B2
(45) Date of Patent: Feb. 28, 2017

(54) TRANSFER SWITCH FOR AUTOMATICALLY SWITCHING BETWEEN ALTERNATIVE ENERGY SOURCE AND UTILITY GRID

(75) Inventor: Neil A. Czarnecki, Mt. Pleasant, WI (US)

(73) Assignee: Reliance Controls Corporation, Racine, WI (US)

( * ) Notice: Subject to any disclaimer, the term of this patent is extended or adjusted under 35 U.S.C. 154(b) by 1243 days.

(21) Appl. No.: 13/350,964

(22) Filed: Jan. 16, 2012

(65) Prior Publication Data

US 2012/0267957 A1    Oct. 25, 2012

Related U.S. Application Data

(60) Provisional application No. 61/477,399, filed on Apr. 20, 2011.

(51) Int. Cl.
*H02J 3/02* (2006.01)
*H02J 9/06* (2006.01)

(52) U.S. Cl.
CPC .............. *H02J 3/02* (2013.01); *H02J 9/062* (2013.01); *Y02B 10/72* (2013.01); *Y02E 10/766* (2013.01); *Y10T 307/615* (2015.04)

(58) Field of Classification Search
CPC .............. H02J 3/02; H02J 9/062; H02J 1/00; H02J 2001/00; Y02E 10/766; Y02B 10/72; Y02B 10/00; H01H 1/00; H01H 45/00; H01H 63/00; H01H 69/00; H01H 2001/00; H01H 2201/00; H01H 2203/00; Y04S 10/00; Y04S 20/00; Y04S 30/00; Y04S 50/00

USPC .......... 307/64, 68; 370/389; 335/14; 200/18; 363/109; 345/559; 700/298
See application file for complete search history.

(56) References Cited

U.S. PATENT DOCUMENTS 4,398,097 A * 8/1983 Schell ...................... H01H 3/26
                                                       307/64
4,672,227 A * 6/1987 Lagree .................... H02J 9/061
                                                       307/64
4,747,061 A * 5/1988 Lagree .................... G01R 15/09
                                                       307/19

(Continued)

FOREIGN PATENT DOCUMENTS

CN         1701481      11/2005
CN        101212145      7/2008

*Primary Examiner* — Rexford Barnie
*Assistant Examiner* — Elim Ortiz
(74) *Attorney, Agent, or Firm* — Boyle Fredrickson, S.C.

(57) ABSTRACT

An automatic transfer switch configured for connection to a non-traditional, full-time or intermittent power source, such as a wind turbine or solar panel, selectively connects the non-traditional power source as a primary power source and a utility-derived power source as a secondary power source. The intermittent power source includes an energy storage device, such as a bank of DC batteries, to supplement power delivery during periods of low energy production. The power is provided to an AC load via a DC-to-AC inverter. The transfer switch includes an input to monitor the voltage level on the energy storage device and will switch from the primary power source to the utility power source when the voltage level on the energy storage device drops below a preset level. Thus, a loading condition that exceeds the rating of the inverter will not fault the inverter or limit the power available to the loads.

12 Claims, 5 Drawing Sheets

(56) References Cited

U.S. PATENT DOCUMENTS

| | | | | |
|---|---|---|---|---|
| 4,760,278 A * | 7/1988 | Thomson | | H01H 9/26 |
| | | | | 200/18 |
| 4,791,255 A * | 12/1988 | Eliezer | | H01H 1/2041 |
| | | | | 200/6 BA |
| 4,894,796 A * | 1/1990 | Engel | | G09G 3/04 |
| | | | | 345/559 |
| 5,081,367 A * | 1/1992 | Smith | | H02J 9/062 |
| | | | | 307/64 |
| 5,182,464 A * | 1/1993 | Woodworth | | H02J 9/06 |
| | | | | 307/64 |
| 5,210,685 A * | 5/1993 | Rosa | | H02J 9/062 |
| | | | | 307/64 |
| 5,397,868 A * | 3/1995 | Smith | | H01H 3/34 |
| | | | | 200/18 |
| 5,638,295 A * | 6/1997 | Lagree | | H02J 3/14 |
| | | | | 187/248 |
| 6,137,191 A * | 10/2000 | O'Leary | | H02J 3/005 |
| | | | | 307/116 |
| 6,577,216 B2 * | 6/2003 | Turner | | H01H 51/08 |
| | | | | 335/159 |
| 6,590,481 B2 * | 7/2003 | Turner | | H01H 71/68 |
| | | | | 200/50.1 |
| 6,593,670 B2 * | 7/2003 | Anderson | | H02J 9/08 |
| | | | | 307/64 |
| 6,801,109 B2 * | 10/2004 | Simms | | H01H 89/06 |
| | | | | 335/14 |
| 6,849,967 B2 * | 2/2005 | Lathrop | | H02J 9/08 |
| | | | | 307/64 |
| 6,861,930 B2 * | 3/2005 | Simms | | H01H 71/46 |
| | | | | 335/14 |
| 6,995,327 B1 * | 2/2006 | Shepstone | | H01H 9/262 |
| | | | | 200/50.01 |
| 7,119,457 B1 * | 10/2006 | Flegel | | H02J 3/14 |
| | | | | 307/64 |
| 7,305,291 B2 * | 12/2007 | Koenig | | H01M 16/006 |
| | | | | 363/35 |
| 7,336,003 B2 * | 2/2008 | Lathrop | | H02J 3/14 |
| | | | | 307/64 |
| 7,535,129 B2 * | 5/2009 | Phelps | | H02J 9/061 |
| | | | | 307/115 |
| 7,898,112 B2 * | 3/2011 | Powell | | H02J 3/42 |
| | | | | 307/85 |
| 7,948,117 B2 * | 5/2011 | Lathrop | | H02J 3/14 |
| | | | | 307/64 |
| 8,699,193 B2 * | 4/2014 | Mizuno | | H02H 7/12 |
| | | | | 361/88 |
| 8,754,547 B2 * | 6/2014 | Jin | | H02J 3/28 |
| | | | | 307/103 |
| 8,823,210 B1 * | 9/2014 | Olah | | H02J 7/0055 |
| | | | | 307/45 |
| 9,136,732 B2 * | 9/2015 | Wolter | | H02J 7/35 |
| 2002/0079741 A1 * | 6/2002 | Anderson | | H02J 9/08 |
| | | | | 307/64 |
| 2004/0076148 A1 * | 4/2004 | Ferry | | H02J 9/06 |
| | | | | 370/389 |
| 2004/0199297 A1 * | 10/2004 | Schaper | | H02J 3/00 |
| | | | | 700/287 |
| 2006/0028069 A1 * | 2/2006 | Loucks | | H02J 3/005 |
| | | | | 307/130 |
| 2006/0129798 A1 * | 6/2006 | Bance | | G05B 19/048 |
| | | | | 713/2 |
| 2006/0221533 A1 * | 10/2006 | Lathrop | | H02J 3/14 |
| | | | | 361/160 |
| 2008/0179958 A1 * | 7/2008 | Lathrop | | H02J 9/06 |
| | | | | 307/68 |
| 2009/0146610 A1 * | 6/2009 | Trigiani | | H02J 7/0018 |
| | | | | 320/119 |
| 2009/0281742 A1 | 11/2009 | Carter et al. | | |
| 2010/0019574 A1 | 1/2010 | Baldassarre et al. | | |
| 2010/0038966 A1 | 2/2010 | Espeut, Jr. | | |
| 2010/0141047 A1 | 6/2010 | Gibbs et al. | | |
| 2011/0057514 A1 | 3/2011 | Lathrop et al. | | |
| 2011/0148360 A1 * | 6/2011 | Lee | | H02J 7/35 |
| | | | | 320/134 |
| 2012/0104848 A1 * | 5/2012 | Lathrop | | H02J 3/381 |
| | | | | 307/29 |

* cited by examiner

TRANSFER SWITCH FOR AUTOMATICALLY SWITCHING BETWEEN ALTERNATIVE ENERGY SOURCE AND UTILITY GRID

CROSS-REFERENCE TO RELATED APPLICATIONS

This application claims priority to U.S. provisional application Ser. No. 61/477,399, filed Apr. 20, 2011, the entire contents of which is incorporated herein by reference.

BACKGROUND OF THE INVENTION

The subject matter disclosed herein relates to a transfer switch for automatically switching between a primary power source and a secondary power source. More specifically, a transfer switch for automatically switching between an alternative energy source and the utility grid is disclosed.

Historically, it has been known to provide a transfer switch to automatically transfer a load from the utility grid to a backup generator in the event the utility grid was not operating properly. For example, the voltage present on the utility grid is monitored, and if the voltage drops below a preset value, the transfer switch switches to a backup power source, such as a generator. Further, the automatic transfer switch may provide a signal to the generator to start the engine and wait until the generator is operating normally before connecting the load to the generator.

With the development of alternative energy sources and their associated power conversion equipment, it may be desirable to provide a power source other than the utility grid as the primary power source. An alternative energy source, such as a photovoltaic array or a wind turbine, may be selected. However, the power supply from such alternative sources is variable, dependent on the amount of sunlight or wind present at a given time. As a result, alternative energy sources are often utilized in combination with an energy storage device. Because the energy storage device stores and supplies a DC voltage, an inverter is provided which converts the DC voltage to an AC voltage suitable for connection to the load.

However, a traditional automatic transfer switch is not well suited for an application in which the primary energy source is an alternative energy source and the secondary energy source is the utility grid. As previously discussed, a typical automatic transfer switch monitors the voltage level of the primary energy source and switches to the secondary source when the voltage level drops below a minimum value. However, an inverter supplying the AC voltage will attempt to regulate the output voltage to maintain the nominal AC voltage, for example 120 VAC. If the alternative energy source is not producing sufficient power to supply the load and the battery has been drained, the inverter will experience a fault condition and shut down. Manual intervention is required to reset the inverter, defeating the purpose of an automatic transfer switch. Further, due to the variable energy production, it is expected that more frequent switching from an alternative energy source to the utility grid would be required than when the utility grid is the primary energy source.

Thus, it would be desirable to provide an automatic transfer switch suitable for use with an alternative energy source as the primary energy source and the utility grid as a secondary source.

BRIEF DESCRIPTION OF THE INVENTION

The subject matter disclosed herein relates to an automatic transfer switch that is configured for connection to non-traditional, full-time or intermittent power sources such as wind turbines, water turbines, and solar panels. The power output of these non-traditional power sources may be used to charge banks of DC batteries, to directly power a load, or a combination thereof. The power is provided to an AC load via a DC-to-AC inverter. The transfer switch is configured such that the inverter-derived power is the primary source, and the utility-derived power is the backup source. The transfer switch operates with the assumption that both sources are available under normal operation.

The transfer switch will switch from the inverter to the utility when the non-traditional power source cannot maintain sufficient output power to satisfy the needs of the load. Because the DC batteries supplement power when the power source is not capable of producing all of the power supplied to the load, the amount of energy remaining in the DC batteries provides an indication whether the non-traditional power source can supply sufficient output power for the load. As the energy level in the DC battery decreases, the DC voltage present on the terminals of the battery typically decreases as well. By detecting when the battery bank DC voltage drops below a preset level, the transfer switch can switch power sources before the inverter reaches a fault condition and shuts down. The transfer switch will also switch from the inverter to the utility when the load current exceeds the rating of the inverter but before the inverter reaches a fault condition and shuts down. Thus, a temporary loading condition that exceeds the rating of the inverter will not cause either a fault in the inverter or restrict the power available to the loads.

According to one embodiment of the present invention, a switch for selectively connecting a load to an alternative energy source and an energy storage device as a primary power source and a utility supply as a secondary power source includes a first input configured to receive a signal corresponding to a level of energy in the energy storage device. At least one actuator selectively connects either the primary power source or the secondary power source to the load, and an electrical circuit generates a control signal for the actuator to selectively connect either the primary power source or the secondary power source to the load as a function of the level of energy in the energy storage device. The electrical circuit may include analog electrical devices, and the control signal generated by the electrical circuit may initiate a transition from the primary power source to the secondary power source if the level of energy in the energy storage device is below a predetermined threshold.

According to another aspect of the invention, a second input is configured to receive a signal corresponding to the operating conditions of the secondary power source, and the electrical circuit further generates the control signal for the actuator as a function of the operating conditions of the secondary power source. The control signal generated by the electrical circuit may initiate a transition from the primary power source to the secondary power source if the level of energy in the energy storage device is below a predetermined threshold and if the operating conditions of the secondary power source are within a predetermined range.

According to still another aspect of the invention, a third input is configured to receive a signal corresponding to a magnitude of current drawn by the load, and the electrical circuit further generates the control signal for the actuator as a function of the current drawn by the load. The control signal generated by the electrical circuit may initiate a transition from the primary power source to the secondary power source if operating conditions of the secondary power source are within a predetermined range and if either the level of energy in the energy storage device is below a predetermined threshold or the magnitude of current drawn by the load is above a predetermined threshold.

According to another embodiment of the invention, an automatic transfer switch for selectively connecting a first power source and a second power source to a load includes a first input terminal electrically connected to the first power source, a second input terminal electrically connected to the second power source, and an output terminal electrically connected to the load. The first power source includes an alternative energy source and an energy storage system. At least one actuator selectively connects one of the first input terminal and the second input terminal to the output terminal. A first sensor measures a first operating parameter corresponding to an energy level in the energy storage system of the first power source, and a second sensor measures a second operating parameter of the second power source. An electrical circuit provides a control signal to the actuator to connect either the first input terminal or the second input terminal to the output terminal as a function of the first and second operating parameters.

According to still another embodiment of the invention, a method of selectively connecting a load to either a first power source, which includes an energy storage device, or a second power source, includes the steps of measuring a level of energy in the energy storage device, connecting the load to the first power source if the level of energy in the energy storage device is greater than a predetermined threshold, and connecting the load to the second power source if the level of energy in the energy storage device is less than the predetermined threshold.

BRIEF DESCRIPTION OF THE DRAWING(S)

Various exemplary embodiments of the subject matter disclosed herein are illustrated in the accompanying drawings in which like reference numerals represent like parts throughout, and in which.

Figure 1:
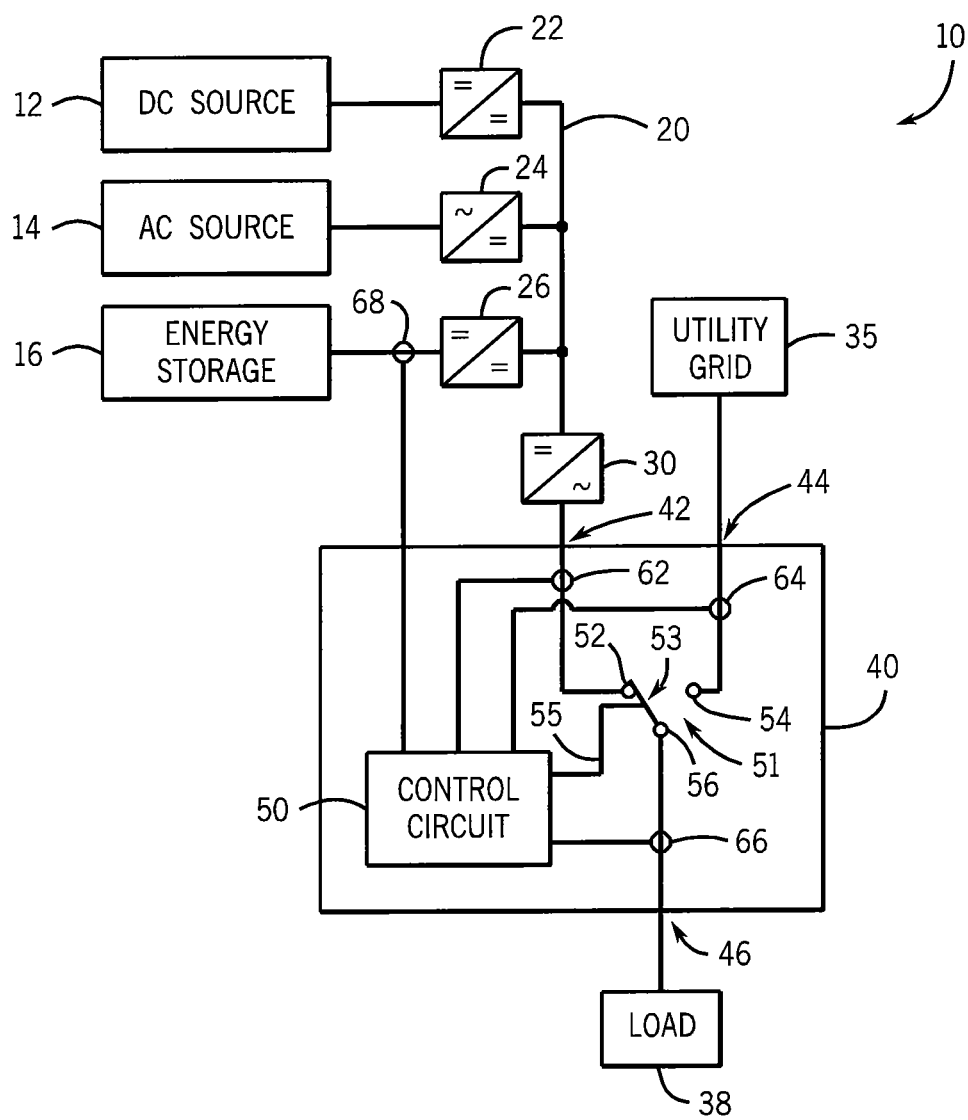
FIG. 1 is a block diagram representation of one embodiment of the present invention.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The various features and advantageous details of the subject matter disclosed herein are explained more fully with reference to the non-limiting embodiments described in detail in the following description.

Referring to FIG. 1, a power generation system 10 may include multiple power sources. The power sources may be any suitable combination of power sources according to the requirements of a specific environment or application. A Direct Current (DC) power source 12, such as a photovoltaic array, generates power having a DC voltage. The DC voltage may be supplied directly to a DC bus 20, also referred to as a DC distribution system/network or a DC link, or the DC voltage may be supplied to the DC bus 20 via a DC-to-DC power converter 22. An Alternating Current (AC) power source 14, such as a wind turbine, water turbine, etc., generates power having an AC voltage. The AC voltage is supplied to the DC bus 20 via an AC-to-DC power converter 24. Because each of these alternative energy sources generates a variable amount of power, an energy storage device 16, such as a battery, is also connected to the DC bus 20 via a power converter 26. The power converter 26 manages bi-directional power flow between the DC bus 20 and the energy storage device 16 such that the energy storage device 16 is charged when the power sources generate energy in excess of the energy required by a load 38 and the energy storage device 16 is discharged, providing the power to or supplementing the power supplied to the load 38, when the power sources generate less energy than that required by the load 38. In addition, a connection to utility grid 35 is also available.

A transfer switch 40 is provided to selectively connect the electrical load 38 to the power sources. The transfer switch 40 includes a first input terminal 42 and a second input terminal 44, each input terminal being configured to establish an electrical connection to one of the power sources. The transfer switch 40 also includes an output terminal 46 configured to establish an electrical connection to the load 38. FIG. 1 is a line drawing and illustrates each of the input terminals, 42 and 44, and the output terminal 46 by a single line. Nevertheless, it is contemplated that each of the terminals may include a single connection or multiple connections, for example two terminals, to selectively transfer connection between a single power lead or between multiple power leads according to the application requirements. According to still another embodiment, one power lead from each source may be selectively connected to the load while another lead from each source may be tied to a common connection.

According to one embodiment of the invention, the first input terminal 42 is connected to an alternative energy source, such as a wind turbine, water turbine, or photovoltaic array, and the second input terminal 44 is connected to the utility grid 35. Referring again to FIG. 1, one or more AC energy sources 14, one or more DC energy sources 12, an energy storage device 16, or any combination thereof may be joined to the DC bus 20. The DC bus 20 is connected to the transfer switch 40 via an inverter 30, which converts the DC voltage present on the DC bus 20 to an AC voltage suitable to be supplied to the load 38. The output of the inverter 30 is connected to the first input terminal 42 of the transfer switch 40.

A switch 51 selectively connects either the first input terminal 42 or the second input terminal 44 to the output terminal 46. Although the switch 51 is illustrated as a single pole, double throw switch, any suitable configuration, such as without limitation a double pole, single throw switch or two single pole, single throw switches, may be used to connect the terminals. The first input terminal 42 is electrically connected to a first input 52 on the switch 51. The second input terminal 44 is electrically connected to a second input 54 on the switch 51. An output 56 from the switch 51 is electrically connected to the output terminal 46. The contact 53 of the switch 51 may be either mechanically or electronically controlled to selectively connect one of the inputs, 52 or 54, to the output 56 of the switch 51. Mechanical operation may be provided by a lever that is accessible by an operator to toggle the contact 53 of the switch 51 between the two inputs, 52 and 54. Electrical operation may be provided by an actuator, such as a solenoid, or a pair of actuators that are selectively energized to draw the contact 53 of the switch 51 between the two inputs, 52 and 54.

Figure 5:
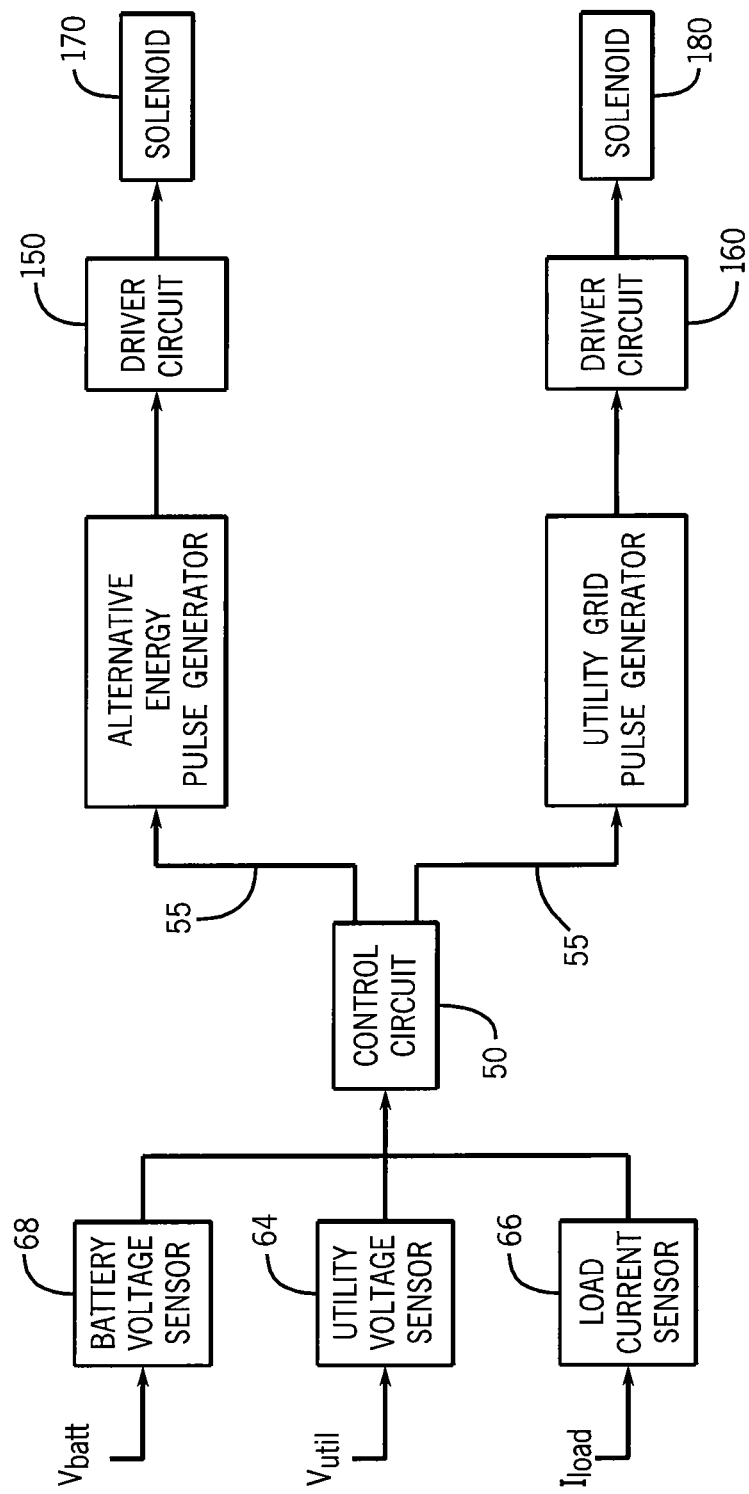
FIG. 5 is a block diagram representation of the electrical circuit controlling the transfer switch according to one embodiment of the invention.

The transfer switch 40 further includes a control circuit 50 which generates at least one control signal 55 to selectively position the contact 53 between either the first input 52 or the second input 54 of the switch 51. The control circuit 50 receives input signals from multiple sensors which monitor the operating performance of the power sources connected to the transfer switch 40. According to one embodiment of the invention, as shown in FIGS. 1 and 5, a first voltage sensor 62 monitors the amplitude of the AC input voltage from the inverter 30. A second voltage sensor 64 monitors the amplitude of the AC input voltage from the utility grid 35. A current sensor 66 monitors the amplitude of the current drawn by the load 38. A third voltage sensor 68 monitors the amplitude of the DC voltage present at the energy storage device 16. According to alternate embodiments of the invention, it is contemplated that voltage and/or current sensors may be positioned in alternate locations of the power system 10 and in alternate combinations to monitor operating performance of the power sources.

Figure 2:
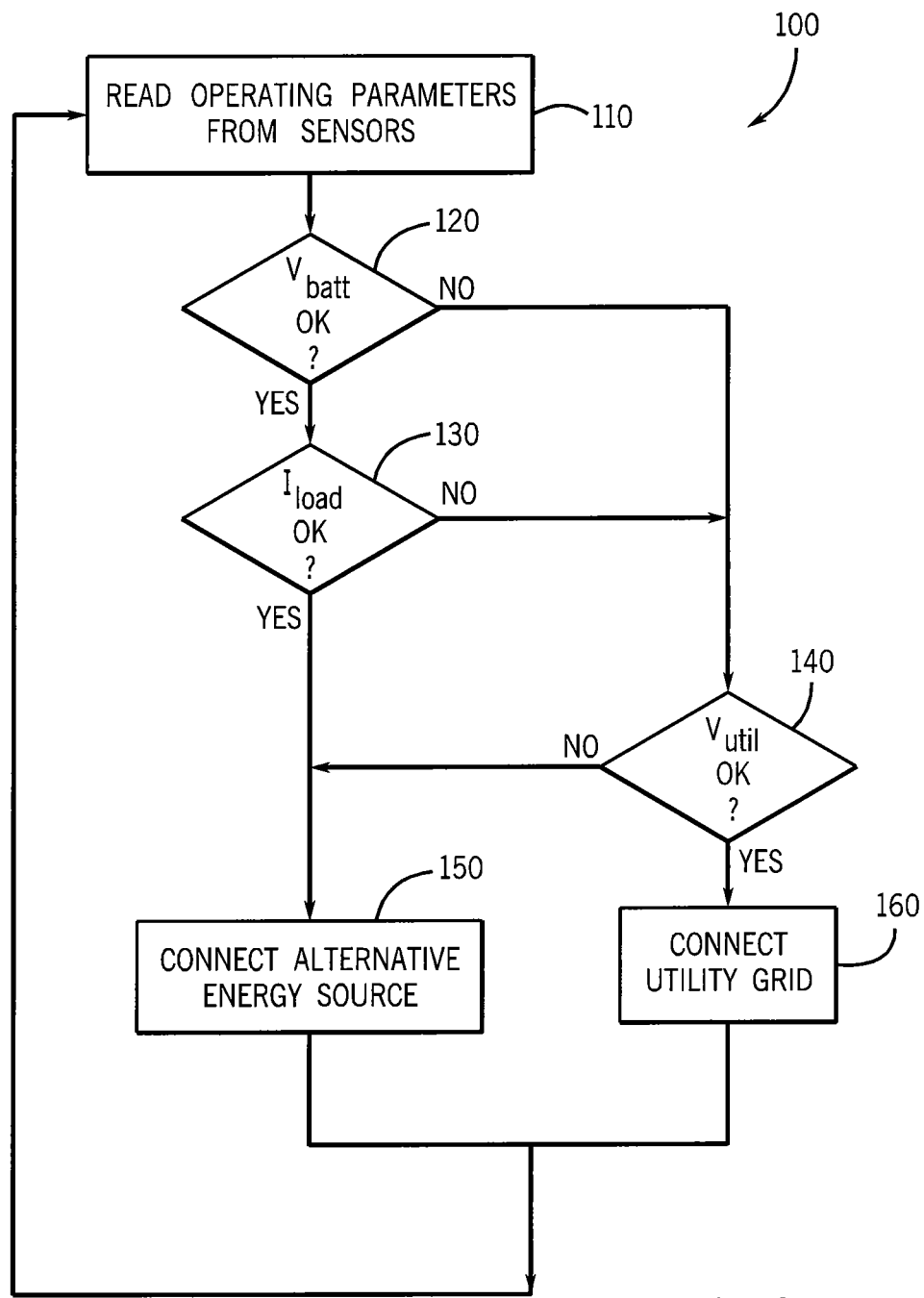
FIG. 2 is a flowchart illustrating the automatic switching of a transfer switch according to one embodiment of the invention.
Figure 3:
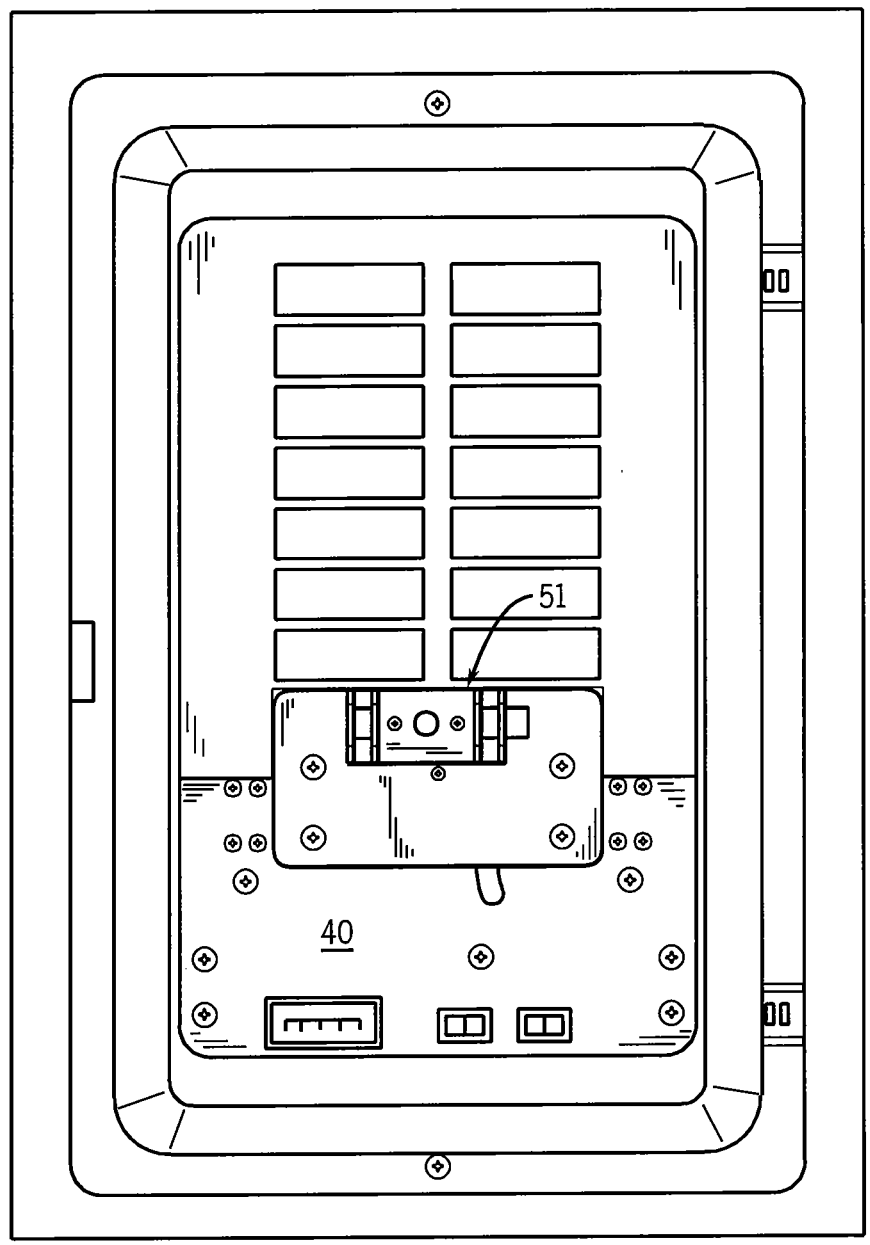
FIG. 3 is an exemplary power distribution panel incorporating one embodiment of the present invention.
Figure 4:
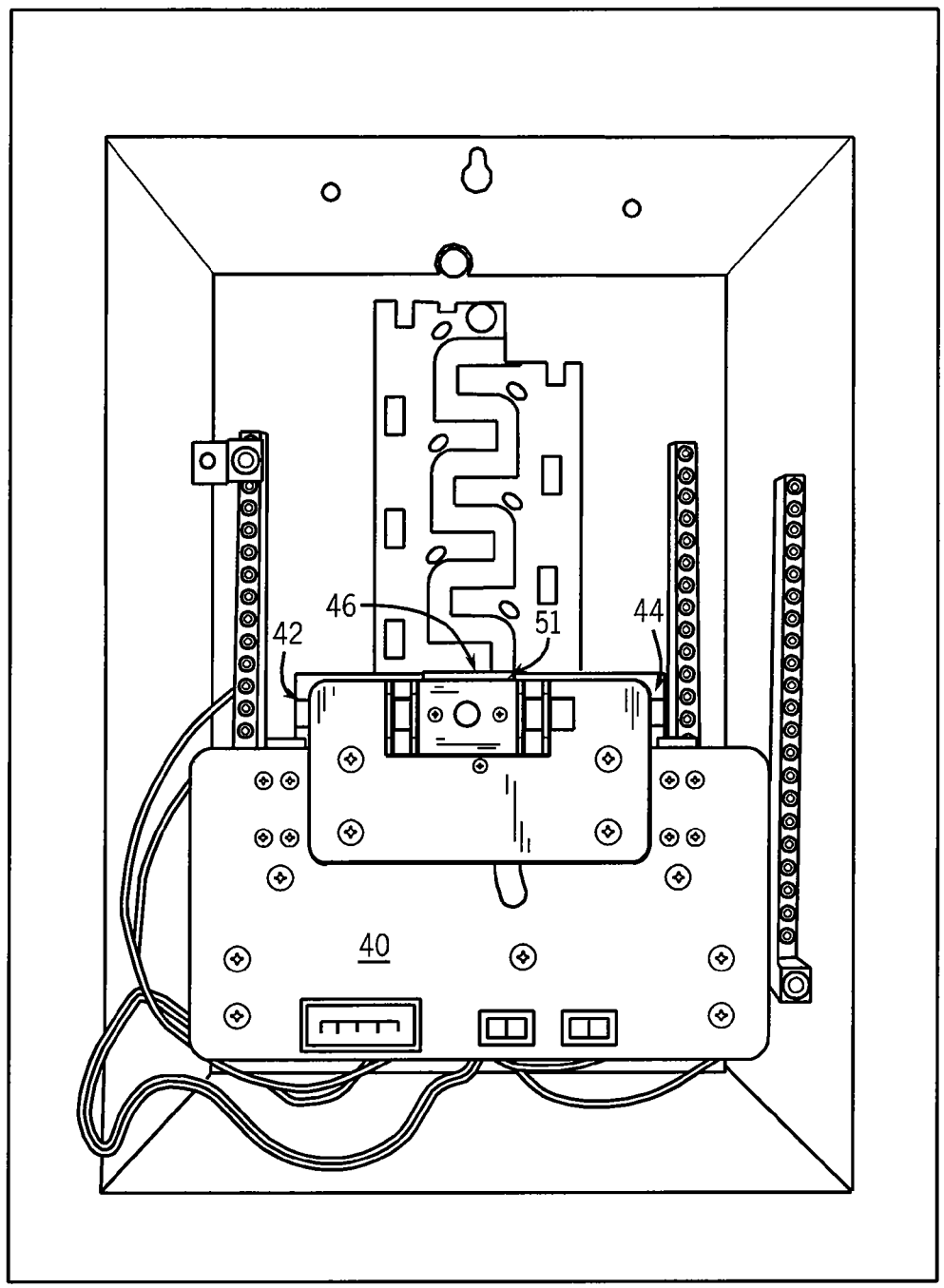
FIG. 4 is the exemplary power distribution panel of FIG. 3 with a cover removed.

Referring also to FIG. 2, at step 110, the control circuit 50 reads the values from each of the sensors, indicating the operating status of each of the power sources. At step 120, the control circuit 50 checks that the voltage level at the energy storage device 16 is at an acceptable level. As the energy storage device 16 is discharged, the amplitude of the DC voltage begins to drop. Discharge of the energy storage device indicates that the alternative energy source is not generating sufficient energy to satisfy the power demand of the load 38. If the charge remaining in the energy storage device drops below a minimum level, it may no longer be possible to fully supplement the alternative energy source to satisfy the demand of the load 38. At this operating point, the inverter 30 would attempt to maintain the commanded magnitude of the AC output voltage; however, with insufficient power at the input of the inverter 30, the inverter could enter a faulted state, requiring a manual reset. In order to prevent the inverter 30 from entering the faulted state, the control circuit 50 may be preconfigured with a threshold value below which it is undesirable to allow the DC voltage at the energy storage device 16 to drop.

If the DC voltage level of the energy storage device 16 is greater than the threshold value, the control circuit 50 proceeds to step 130 and checks the amplitude of the current being drawn by the load 38. The control circuit 50 may be preconfigured with a maximum current value above which it is undesirable to operate the inverter 30, since inverters commonly have a short-term current rating as well as a long-term current rating. By monitoring the amplitude of the current drawn by the load 38, the transfer switch 40 may disconnect the load 38 from the alternative energy source and reconnect the load 38 to the utility grid 35 if, for example, the current drawn exceeds the long-term current rating of the inverter 30 but before the current exceeds the short-term current rating of the inverter 30, causing inverter 30 to enter a faulted state. If both the DC voltage level at the energy storage device 16 and the current drawn by the load 38 are within the desired operating limits, the control circuit 50 generates a control signal 55 to connect the alternative energy source to the load 38, as shown at step 150.

If the DC voltage level of the energy storage device 16 is less than the threshold level, the control circuit 50 proceeds to step 140 and checks the magnitude of the AC voltage being supplied by the utility grid 35. Similarly, if the DC voltage level of the energy storage device 16 is above the threshold level but the current drawn by the load 38 exceeds its setpoint, the control circuit 50 again proceeds to step 140 and checks the magnitude of the AC voltage being supplied by the utility grid 35. The control circuit 50 may be preconfigured with a minimum and/or a maximum value for the AC voltage from the utility grid 35. If the AC voltage from the utility grid 35 is operating at an acceptable level, the control circuit 50 generates a control signal 55 to connect the utility grid 35 to the load 38, as shown at step 160. Verifying that the utility grid 35 is operating within acceptable parameters prior to connecting the load 38 to the utility grid 35 reduces the potential for damage to the electrical systems or devices which constitute the load 38.

If neither power source is operating within desired parameters, the control circuit 50 generates a control signal 55 to connect the alternative energy source to the load 38, as shown at step 150. For example, if either the DC voltage level of the energy storage device 16 is less than the minimum voltage desired for operation of the inverter or the current drawn by the load exceeds the maximum current draw desired for operation of the inverter yet the utility grid 35 is not within acceptable operating parameters, continuing to provide power from the alternative energy source may extend the duration of time that power may be supplied to the load 38. The inverter 30 will attempt to maintain the commanded output voltage and supply the demanded current as long as the energy from the primary source allows and as long as the current does not exceed the short term overload of the inverter 30. Thus, if the utility grid 38 is not available, keeping the primary source connected to the load 38 may allow power to be supplied during a temporary dip in voltage or spike in current. However, if the utility grid 35 remains unavailable and the primary source is outside of its desired operating parameters for too long, the inverter 30 will necessarily fault to prevent damage to the inverter 30.

The steps illustrated in FIG. 2 are performed on a periodic or continuous basis. Referring also to FIG. 5, the components of the control circuit may be implemented either in a digital or analog manner. Each of the sensors monitoring performance of either the primary or secondary supply provides an analog signal to the control circuit 50. Comparators implemented, for example, using operational amplifiers compare the signal to a reference value to determine whether each supply is operating within an acceptable range. The outputs of the operational amplifiers may drive discrete logic gates and solenoid driver circuits, 150 or 160. The solenoid driver circuits, 150 or 160, activate solenoids, 170 or 180, to selectively position the switch 51 and to connect either the primary source or the secondary source to the load 38. Thus, an analog circuit may continuously monitor the operating conditions of each of the sources and select the proper source accordingly. Optionally, a portion of the control circuit 50 may be implemented digitally, for example in a field programmable gate array (FPGA), application specific integrated circuit (ASIC), or within a microprocessor. A digital circuit may, therefore, periodically monitor the operating parameters according to the execution of instructions within a device.

Regardless of implementation, it is desirable that a transfer between primary and secondary sources occurs quickly enough to avoid an observable disruption of power at the load 38. Because the transfer switch 40 is configured to be connected to a variable or intermittent energy source as the primary energy source and to the utility grid as a secondary energy source, it is contemplated that the transfer switch 40 will need to switch between the primary and secondary sources more frequently than a conventional transfer switch. Further, such transfers may occur under normal operating conditions rather than as a backup system solely in the event of a failure of the first power source. It is desirable that, when necessary, the transfer switch 40 disconnects the primary power source and reconnects the secondary power source quickly to minimize or eliminate noticeable indications of the switch over, for example a flickering of lights or temporary interruption of the picture on a television. As a result, implementing the control circuit 50 using the analog circuit devices may provide improved responsiveness and fast switching capabilities.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

The invention claimed is:

1. A switch for selectively connecting a grid independent alternative energy source and an energy storage device, operatively connected to the alternative energy source, as a primary power source and a utility supply as a secondary power source to a load, the switch comprising:
    a first input configured to receive a signal corresponding to a voltage level in the energy storage device;
    a second input configured to receive a signal corresponding to a magnitude of current drawn by the load;
    a third input configured to receive a signal corresponding to the operating conditions of the secondary power source;
    at least one actuator selectively connecting one of the primary power source and the secondary power source to the load, wherein the at least one actuator prevents connection of the primary power source to the secondary power source; and
    an electrical circuit generating a control signal for the actuator to connect the primary power source to the load when the voltage level in the energy storage device is greater than a threshold value and when the magnitude of current drawn by the load is below a maximum current level and to connect the secondary power source to the load when either the voltage level in the energy storage device is less than the threshold value or the magnitude of current drawn by the load is greater than the maximum current level, wherein the threshold value is a voltage level at which an inverter connected between the energy storage device and the load can continue to provide power to the load when the energy storage device provides, at least in part, the power input to the inverter and wherein the electrical circuit further generates the control signal for the actuator as a function of the operating conditions of the secondary power source.

2. The switch of claim 1 wherein the control signal generated by the electrical circuit initiates a transition from the primary power source to the secondary power source if the operating conditions of the secondary power source are within a predetermined range.

3. The switch of claim 1 wherein the electrical circuit includes analog electrical devices.

4. An automatic transfer switch for selectively connecting a first power source and a second power source to a load, comprising:
    a first input terminal electrically connected to an inverter, wherein the inverter is connected to a shared DC bus to which a grid independent alternative energy source and an energy storage system are operatively connected, wherein the grid independent alternative energy source and the energy storage system comprise the first power source;
    a second input terminal electrically connected to the second power source;
    an output terminal electrically connected to the load;
    at least one actuator selectively connecting one of the first input terminal and the second input terminal to the output terminal, wherein the at least one actuator prevents connection of the first input terminal and the second input terminal;
    a first sensor measuring a first operating parameter corresponding to an energy level in the energy storage system;
    a second sensor measuring a second operating parameter of the second power source;
    a third sensor measuring a third operating parameter of the load; and
    an electrical circuit providing a control signal to the actuator to connect either the first input terminal or the second input terminal to the output terminal as a function of the first, second, and third operating parameters.

5. The automatic transfer switch of claim 4 wherein the first sensor measures a DC voltage level of the energy storage system and the electrical circuit initiates a transition from the first power source to the second power source if the DC voltage level is below a predetermined threshold.

6. The automatic transfer switch of claim 5 wherein the second power source is a utility grid, the second sensor measures an AC voltage level of the utility grid, and the electrical circuit aborts the transition from the first power source to the second power source if the AC voltage level is outside of a desired operating range and the electrical circuit completes the transition from the first power source to the second power source if the AC voltage level is within the desired operating range.

7. The automatic transfer switch of claim 6 wherein the third operating parameter is a current value drawn by the load and the electrical circuit initiates a transition from the first power source to the second power source if the current value is above a predetermined threshold.

8. The automatic transfer switch of claim 7 wherein the second power source is a utility grid, the second sensor measures an AC voltage level of the utility grid, and the electrical circuit aborts the transition from the first power source to the second power source if the AC voltage level is outside of a desired operating range and the electrical circuit completes the transition from the first power source to the second power source if the AC voltage level is within the desired operating range.

9. The automatic transfer switch of claim 4 wherein the electrical circuit includes analog electrical devices.

10. A method of selectively connecting a load to either a first power source, wherein the first power source includes a grid independent alternative energy source and an energy storage device, or a second power source, comprising the steps of:
  measuring a voltage level in the energy storage device;
  measuring an amplitude of current drawn by the load;
  measuring operating conditions of the second power source;
  connecting the load to the first power source with an actuator when the voltage level in the energy storage device is greater than a predetermined threshold and the amplitude of current drawn by the load is less than a maximum current level; and
  connecting the load to the second power source with the actuator when either the voltage level in the energy storage device is less than the predetermined threshold or the amplitude of current drawn by the load is greater than the maximum current level, wherein:
  the predetermined threshold is a voltage level at which an inverter connected between the energy storage device and the load can continue to provide power to the load when the energy storage device provides, at least in part, the power input to the inverter,
  the actuator prevents connection between the first power source and the second power source, and
  the step of connecting the load to the second power source is performed as a function of the operating conditions of the secondary power source.

11. The method of claim 10 wherein the second power source is the utility grid and further comprising the step of measuring an amplitude of voltage present on the utility grid and wherein the step of connecting the load to the second power source is performed only if the voltage present on the utility grid is within an acceptable range.

12. A switch for selectively connecting a grid independent alternative energy source, an energy storage device, and a utility supply to a load, wherein the grid independent alternative energy source is operatively connected to a DC bus, the energy storage device is operatively connected to the DC bus, and the utility supply is isolated from the DC bus, the switch comprising:
  a first input terminal configured to receive power from an inverter connected to the DC bus;
  a second input terminal configured to receive power from the utility supply;
  a third input configured to receive a signal corresponding to a voltage level in the energy storage device;
  at least one actuator selectively connecting one of the first input terminal and the second input terminal to the load, wherein the at least one actuator prevents connection of the utility supply with the energy storage device;
  a first sensor configured to generate a signal corresponding to a magnitude of current drawn by the load;
  a second sensor configured to generate a signal corresponding to operating conditions of the utility supply; and
  an electrical circuit generating a control signal for the actuator to selectively connect either the first input terminal or the second input terminal to the load as a function of the voltage level in the energy storage device, as a function of the magnitude of current drawn by the load, and as a function of the operating conditions of the utility supply.

\* \* \* \* \*